Figure 6:
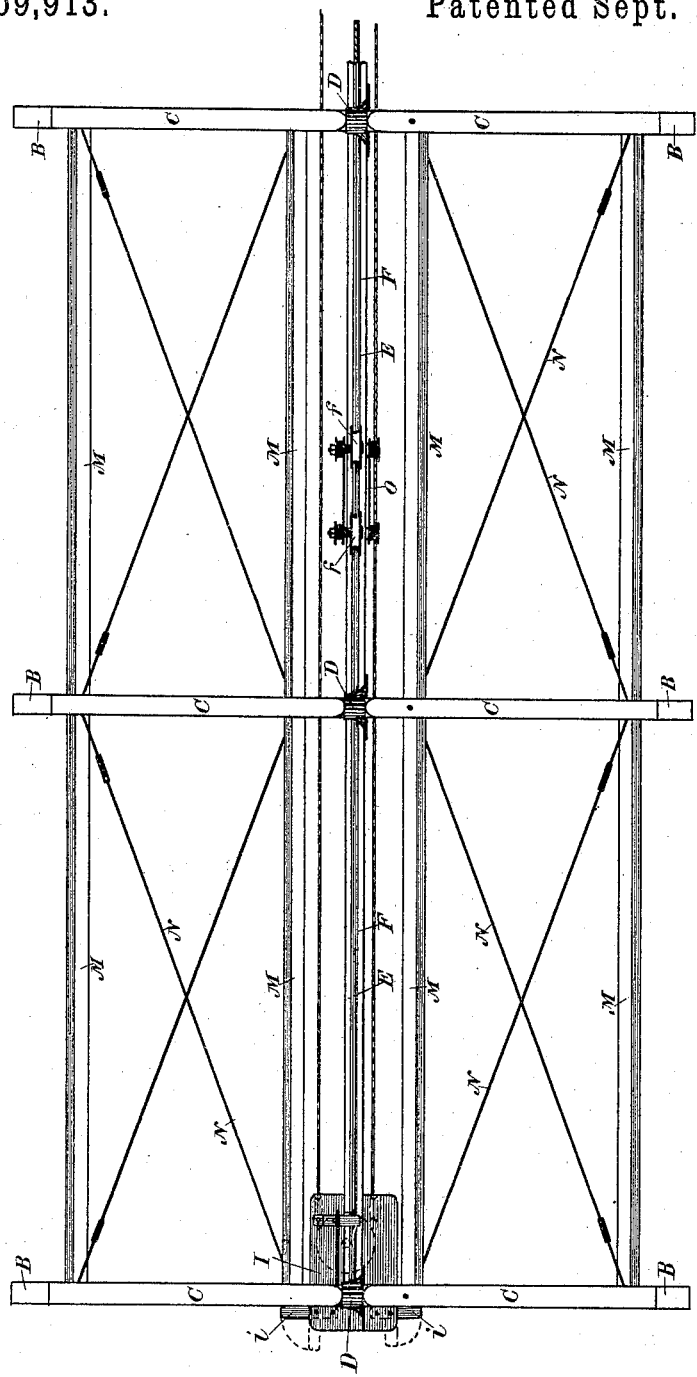

(No Model.)　　　　　　　　　　　　　　　　5 Sheets—Sheet 1.
A. E. BROWN.
HOISTING AND CONVEYING MACHINE.
No. 369,913.　　　　　　　　　　Patented Sept. 13, 1887.
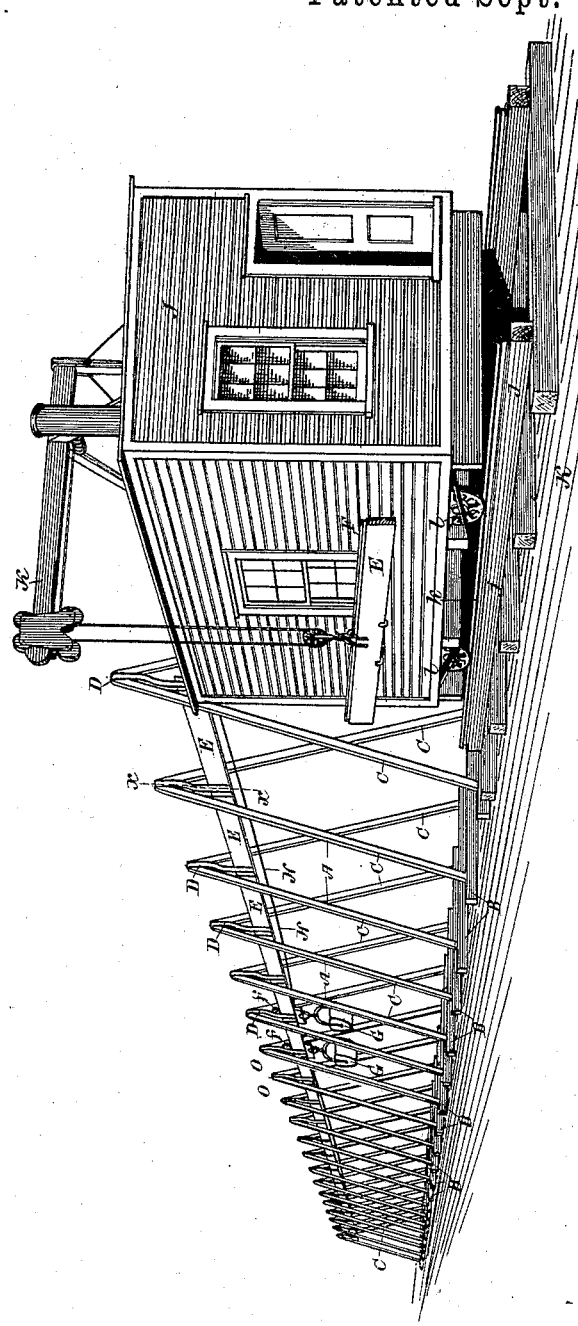

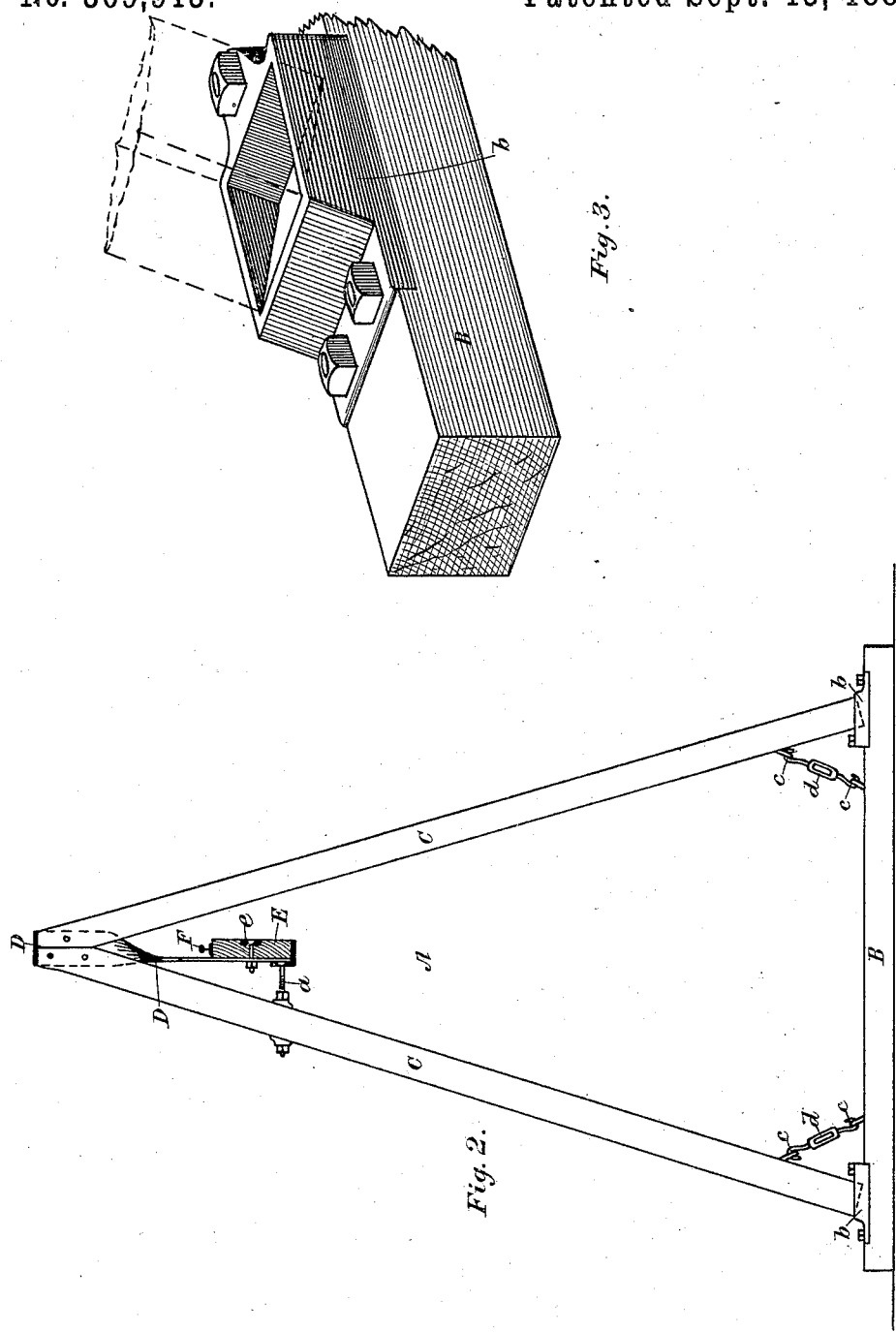

(No Model.) 5 Sheets—Sheet 3.
A. E. BROWN.
HOISTING AND CONVEYING MACHINE.
No. 369,913. Patented Sept. 13, 1887.
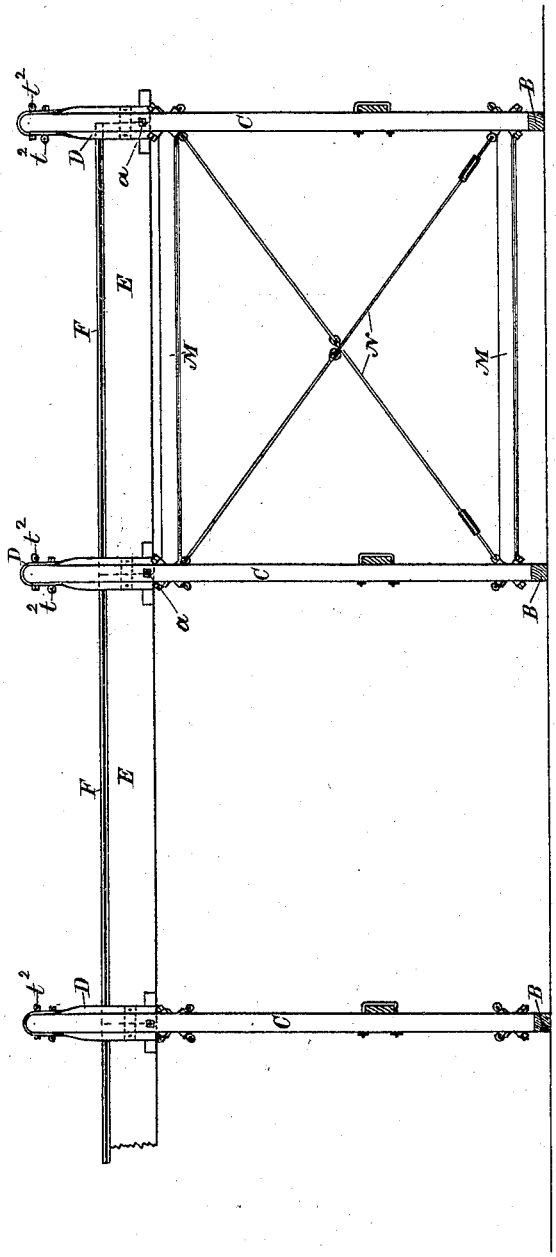
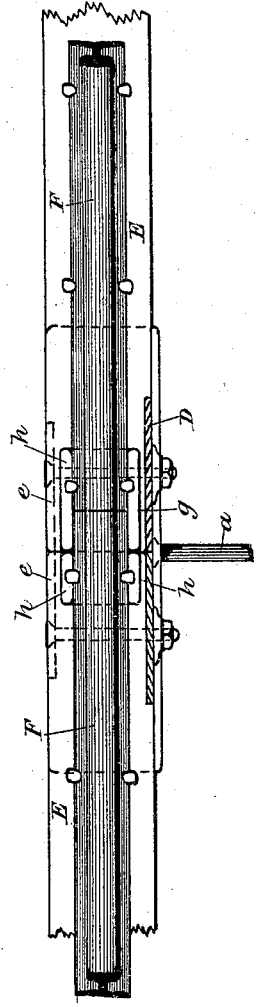

(No Model.)  5 Sheets—Sheet 4.

A. E. BROWN.
HOISTING AND CONVEYING MACHINE.

No. 369,913.  Patented Sept. 13, 1887.

Witnesses
W. J. Graham.
H. Hansen

Inventor
Alex. E. Brown,
By J. N. McIntire. Att'y.

(No Model.) 5 Sheets—Sheet 5.
A. E. BROWN.
HOISTING AND CONVEYING MACHINE.
No. 369,913. Patented Sept. 13, 1887.
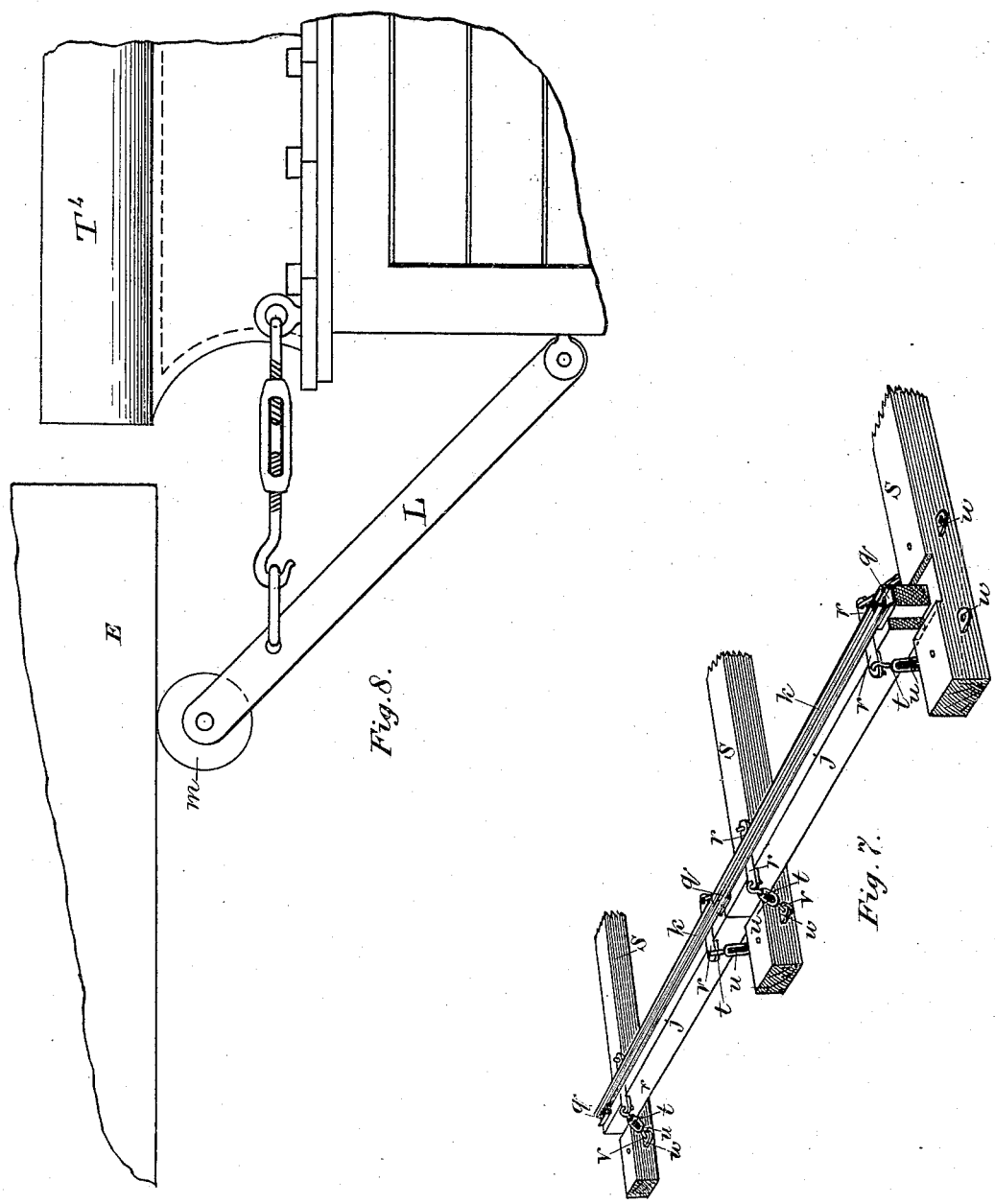
Witnesses
W. J. Graham
H. Hansen
Inventor
Alex. E. Brown.
By J. H. McIntire Atty.

UNITED STATES PATENT OFFICE.

ALEXANDER E. BROWN, OF CLEVELAND, OHIO.

HOISTING AND CONVEYING MACHINE.

SPECIFICATION forming part of Letters Patent No. 369,913, dated September 13, 1887.

Application filed March 15, 1887. Serial No. 231,024. (No model.)

*To all whom it may concern:*

Be it known that I, ALEXANDER E. BROWN, of Cleveland, in the county of Cuyahoga and State of Ohio, have invented certain new and useful Improvements in Hoisting and Conveying Machines; and I do hereby declare that the following is a full, clear, and exact description thereof, reference being had to the accompanying drawings, making part of this application.

My invention relates to an elevated tramway apparatus or contrivance adapted especially to the purposes of hoisting and conveying materials in the operations of digging ditches, more especially for the purpose of sewer-building, in which the earth or other material to be removed is generally to be taken away from the portion of the ditch being dug and conveyed to cover over the finished portions of the sewer being constructed; and it consists in certain novel features of construction, which will be hereinafter fully described, and which will be most particularly defined and pointed out in the claims in this specification.

To enable those skilled in the art to make and use my invention, I will now proceed to more fully describe it, referring by letters to the accompanying drawings, which form part of this specification, and in which I have shown a sewer elevating and conveying machine embracing the several features of my invention and involving that form of carrying the latter into effect which is about the best now known to me and which I have adopted with success in practice.

In the drawings, Figure 1 is a perspective view of an apparatus made according to my invention. Fig. 2 is a vertical cross-section on the line *x x* of Fig. 1. Fig. 3 is a detailed perspective view of the lower portion of one of the A-frames, showing more particularly the means by which the obliquely-arranged side pieces are secured to the sills in a removable manner. Fig. 4 is a detailed side view of a portion of the tramway. Fig. 5 is a detailed top view of the track-beam in the vicinity of one of the joints or splices. Fig. 6 is a top view of the anchorage or terminal stand, showing the construction or means by which it is rendered capable of easy translation from one position to another. Fig. 7 is a detailed perspective view showing the construction and arrangement of the transposable track-beams on which the engine-house rests and travels. Fig. 8 is a detailed elevation illustrating particularly the construction and operation of a device combined with the engine-house and used for the purpose of supporting the forward end of a track-beam in the operation of extending the building onto the leading end of the structure.

In the several figures the same parts will be found designated by the same letters of reference.

A are A-frames, a number of which sufficient for the requisite length of the tramway are employed. These frames are composed each of a sill or base-piece, B, (supported upon any suitable leveling-blocks or base-pieces,) and two sticks, C, which are secured to the base-pieces in a removable manner, as will be presently explained, and which meet at the upper ends, and are there chamfered off to come to a bearing-joint, as clearly shown.

D are metallic suspender devices formed of broad plates bent and twisted, as shown, so as to loop over the upper adjacent ends of the sticks C, and so as to afford depending legs, to which are secured and by which are supported the sectional tram-beams E. The lower ends of the suspender-pieces are preferably either formed or provided with lateral projections, which pass beneath and on which rest the lower edges of the track-beams, and the lower portions of said suspenders are rigidly connected at their rear sides with one of the sticks of the A-frames by means of tie rods or bolts *a*, as clearly shown.

Each one of the base-pieces or sills B is provided with metallic shoes or seats *b*, the upper surfaces of which are preferably inclined to coincide with the plane of the lower end of the sticks C, which are sawed off at right angles, and a tie rod or loop is applied where each of the sticks is combined with each of the base-pieces, as clearly shown at *c*, said tie rods or loops being composed of threaded links or hooks, which engage with a hand-nut or turnbuckle, *d*, by the turning of which in one direction the lowermost portion of the stick C may be drawn home against and held securely in the seat or shoe *b*, while by turning the hand-nut in an opposite direction it may be liberated from one of the hook-links and permit the entire separation of the stick from the base-piece.

Each of the suspender-irons D has its upper loop-like end permanently secured to that one of the sticks C to which its lower end is securely braced by the tie rod or bolt, as hereinbefore explained, while the other stick of the A-frame is secured to said loop-like portion of the metallic suspender device by means of, preferably, a single bolt, by the removal of which the said sticks of the A-frame may be readily separated at their upper ends.

The track-beam is composed, as before mentioned, of a series of sections or stringer-pieces, each one of which is equal in length to the designed space between each pair of A-frames, and the several pieces of the track-beams are arranged to come to a joint or abutment in the vicinity of each one of the metallic suspenders, so that one end of each section of the track-beam rests upon a supporting-foot of said suspender. On the opposite vertical side of the abutting pieces to that at which the suspender-iron is located is arranged a metallic splice bar or plate, $e$, which is let into the surfaces of both sections of the track-beam, so as to come flush with their outer faces, and which is bolted near either end to the beam, and also to the suspender-iron, by bolts passing through both of said devices and provided with nuts at the back side of the suspender-iron. The heads of these bolts are countersunk in the splice-plate $e$, the object of having the heads of these bolts and outer surfaces of the splice-irons flush with the outer surfaces of the track-beams being to avoid any obstruction to the movement of the hoisting and conveying machines O, the frames of which run close to the surface of the track-beam, in a manner well known and as illustrated in the drawings. These machines O are mounted with their track-wheels $f$ running upon the metallic rail F of the track-beams, and this metallic rail (which is of the usual T form, preferably) is formed of sections corresponding in length with the sections of the track-beam, but with its ends arranged to project slightly over the section of the track-beam at one end and fully the same distance short of the end at the other end. By this arrangement of the metallic rails with the track-beam sections I am enabled to make the metallic rail of each track-beam section rest for a short distance upon and overlap the top edge of the next adjacent track-beam, its overlapping end abutting against the adjacent end of the metallic rail of the next stringer-piece. These track-rails I secure to the upper edges of the track-beams by chairs $g$ and $h$, which are made, respectively, double and single, as shown, so that while the single chair holds securely in place one end of one of the rails the overlapping end of the rail is securely held in the proper juxtaposition with its adjacent rail by the double chair thus combined with the latter.

G are the hoisting and conveying buckets suspended from sheave-blocks that are adapted to engage, in a well-known manner, with the traversing carriages or machines, and which are raised and lowered through the medium of a hoist-rope, H, which passes partially around the wheel of said sheave-block, thence partially around the rope-wheels of the machine, and thence in opposite directions to the anchorage or pull-sustaining stand I onto the drum of the hoist-machine in the engine-house, respectively. The metallic stand or anchorage to which the stationary end of the hoist-rope H is attached is provided with a suitable means of attachment to permit the hoist-rope to pull against it with an elastic frame; but as this device constitutes the subject-matter of another application of mine, in which it will be found fully described, I need not explain its construction and operation here. This anchorage device or movable stand I is provided with laterally-projecting adjustable arms or devices $i$, which, when set in the position shown at Fig. 6, form stops against the rear surfaces of the sticks C of the last one of the A-frames, (that is, the frame at the tail end of the structure,) so that these laterally-projecting devices abut against the sticks of the A-frame and take the strain or pull of the hoist rope attached to said stand. Whenever it may be desired to change the position of this stand or anchorage device, these holdfast devices $i$ may be turned into the position shown in dotted lines at Fig. 6, so as to permit the movement of the stand or its traveling along the tramway, from which it is suspended in a movable manner, until the holdfast devices $i$, which are to be suddenly thrown out again into their projecting positions, will come against the rearmost surfaces of the sticks of the next forward A-frame in the structure, against which A-frame it will then come to a stop and operate as in its former position.

J is the engine house or truck carrying the boiler, engine, and hoist-drum, which house is mounted to travel or to be moved, when desired, upon track-beams $j$, provided with suitable metallic rails, $k$, on which run the wheels $l$ of the engine-house; and on top of said house is located a hoisting-frame, K, which is adapted to have the requisite swing over the top of the house for elevating from the ground at one side of the engine-house and transferring to the top of the latter sections of track-beam as they may be required for use in building on it or extending the leading end of the tramway structure. At Fig. 1 I have shown one of these supplemental track-beams placed at the side of the engine-house and in a position ready to be hoisted by the frame or derrick K, by which it is deposited on the top of the house, in a manner and for a purpose to be presently explained. On the top of the engine-house is formed a trough or beam-carrier, $T^4$, (see Fig. 8,) adapted to support or contain a track-beam or stringer, and within which a supplemental beam such as just referred to, when hoisted, is placed so as to be substantially in line with the track-beams of the standing structure; and when it may be required to add this beam to the structure in extending the leading end of the latter an attendant simply shoves out the projecting end of the beam located in the trough T⁴ far enough to bring its rear end into proper juxtaposition with the leading end of the forward section of the track-beam of the structure, and securely couples the abutting ends of the beam-sections by inserting one of the bolts, before explained as passing through the track-sections, one of the spliced plates, and one of the suspender devices D. Then, by a movement forward of the engine-house, the latter is caused to traverse along beneath and out from under the newly-applied section of track-beam until the leading end of the latter rests upon the idler or supporting roller m (see Fig. 8) of the adjustable bracket or crane-like contrivance L, with which the rear end of the engine-house is provided, as shown; and when the house shall have been moved to the proper distance, leaving the leading end of the additional track-beam thus properly supported and adjusted on top of the roller m, a new or fresh set of pieces for the construction of an A-frame are placed properly in position, and securely united together by the means shown and hereinbefore described, and the leading end of the new track-section securely bolted to the suspender-iron of the added A-frame. In this way, after the proper movement of the engine-house, an additional section is added onto the leading end of the structure. This additional section is composed of a supplemental section of track-beam held in readiness on top of the house, as before explained, and an A-frame removed from the tail end of the structure, where its presence is no longer needed, and it is for the purpose of thus transposing the A-frames and sections of the track-beam successively from the tail end to the leading end of the structure that the movable or adjustable anchorage-stand, constructed and operated as hereinbefore explained, becomes an important and necessary element of my improved apparatus.

After the described operation of adding on a new section to the leading end of the structure, the section of track-beam remaining from the removed section taken from the tail end of the structure is carried to the vicinity of the engine-house, and from the position in which one is there shown (at Fig. 1) said removed track-section is elevated by the frame K and placed on top of the house, in readiness for a repetition of the operation just above explained. In both taking down and putting up the transposable parts these operations are rendered easy of accomplishment, from the fact that it is only necessary to uncouple the metallic holdfast devices which confine the lower ends of the sticks C within their metallic seats in the sill-pieces, and to remove a couple of bolts at the top of the structure, one from the upper portion of the suspender devices D, that secures to it one of the sticks C, and another from the splice-plate which connects the abutting ends of two track-sections to each other and to the lower portion of one of said suspender devices.

In order to give a sufficient rigidity to one or two of the rearmost sections of the structure, to enable this portion to withstand the pull of the hoist-rope without undue compressive strain on the tramway, one or two sections at the tail end of the structure are provided with longitudinal wooden brace-beams M and diagonally-arranged metallic braces or tie-rods N, this device being all made, as shown, removable or detachable, so that in removing a section from the tail end of the structure and adding one onto the leading end, the longitudinal braces M and cross-braces N may simply be detached and reattached to the next forward section of the structure. In this manner the tail portion of the structure is always kept in the form of a pier, and has the necessary rigidity for the purposes above alluded to.

Near the upper end of each A-frame one or more eyebolts is or are applied, as shown at t², which are used for the purpose of hitching on suitable ropes or cables which have to be employed in the operation of taking down and putting up the A-frames during the transposition of portions of the structure from the tail end to the leading end, as I have before explained.

As the rails on top of the track-beams break the joints, as shown and explained, and are held and secured in line by the telescopic adjustment of the projecting rail ends relatively to the leveling-chairs before mentioned, the tracks and track-beam sections, it will be seen, are easily placed and maintained in line, so as to avoid any jog at the points of jointure between the several sections of the tramway portion of the structure.

The track on which the engine-house is supported, and on which it travels periodically whenever it becomes necessary to add a section to the leading end of the structure, is composed of two sections of track-beam at each side, which are supported upon suitable sill-pieces and which are detachable and transposable in the following manner: The adjacent ends of the two sections of track used at either side of the house are formed so that one has a vertical groove in its end and the other a correspondingly sized and shaped tongue, so that when the adjacent ends of the two beams are placed end to end and close together, as illustrated in the drawings, this tongue and groove device interlock to bring and hold the parts in a proper position relatively. The metallic rail on each beam is set so as to fall short of the grooved end of the beam and overhang or extend beyond the end having a tongue, and these rails are held laterally at each end by chairs $q$, which are long enough to embrace the overhanging or projecting end of the rail at the tongue end of one beam and the receded end of the rail at the grooved end of the next beam, all as clearly shown. By this construction and arrangement of the matched ends of the beams and the laterally-confined chairs that break joints of the abutting ends of the metallic rails, the proper juxtaposition of both the beams and the metallic rails is assured in putting the parts together.

Through the adjacent ends of the separate beams are formed slots, in which are securely fastened (by pins or otherwise) transversely-arranged metallic plates $r$, the ends of which project laterally from the beams and are perforated for the reception of the hooked ends or loops of the metallic tying devices $t$, which are coupled by hand-nut or turn-loop $u$ with similar tie rods or devices, $v$, the hooks of which engage with the perforated ends of a flat bar fastened transversely in the sill or cross-piece S, on which the beams rest, and the arrangement of the beams with the said sill relatively to the metallic devices $r$ in the beams and those marked $w$ in the sill is such that on tightening up the tie-rod mechanism shown the operation and effect will be to draw the ends of the track-beams firmly together, to also clamp the track-beams securely onto the supporting-sill S, and, furthermore, to exercise a centralizing strain on all the parts, so as to pull them together and retain them in precisely the desired relative positions.

Of course the structure shown and described, especially with reference to the main feature of my invention, may be more or less modified and changed without changing the novel principle of construction or mode of operation involved.

Having now so fully explained the construction and operation of my improved transposable hoisting and conveying tramway apparatus as to enable those skilled in the art to make and use my invention, what I claim therein as new, and desire to secure by Letters Patent, is—

1. In an elevated tramway structure, the combination of a series of A-frames and track-beams made in lengths about equal to the distances between the A-frames, that are transposable in sections by the removal of one or more sections from the tail end of the structure and the placement of the same at the leading end of the structure, all in substantially the manner specified, for the purposes set forth.

2. In a transposable tramway structure adapted, as specified, to have one or more sections transposed from one end of the structure to the other, the combination, with each of the supporting-frames, of means for the attachment of suitable longitudinal and cross braces and diagonal tie rods or braces and longitudinal stiffening-bars adapted to be shifted from one to another of the sections of the structure for the purpose of transforming the strain-supporting crosses or A-frames at the tail end of the structure into strain-sustaining piers, successively, as hereinbefore set forth.

3. In a tramway structure, the combination, with suitable sills or base-pieces, of A-frames composed of separate sticks, suitable metallic shoe-pieces, in which the lower ends of said sticks are seated, and adjustable metallic tying devices for holding the lower ends of the sticks in secure engagement with the seats of the sill-pieces, substantially as hereinbefore set forth.

4. In combination with a series of A-frames in a transposable tramway structure, a series of metallic or other eyes, or suitable device, arranged near the upper ends of said frames, for the purpose of hitching on ropes or cables for conveniently lowering and raising the frames in transposed parts of the structure, as hereinbefore set forth.

5. In a transposable tramway structure, sectional track-beams adapted to be spliced, as specified, and having combined therewith metallic splice-plates let into the faces of the adjacent ends of the beams, and secured thereto and also to the metallic suspender devices of the tramway by suitable securing-bolts, substantially as hereinbefore set forth.

6. In combination with each of the A-frames of the transposable tramway structure, metallic eyebolts located near the tops and bottoms of said A-frames, and a series of diagonal tie-rods and detachable fastening devices for securing the parts in place and permitting their adjustment and attachment, substantially as and for the purposes hereinbefore described.

7. In combination with the suspended tramway, composed of a series of sections of separate beams equal in length to the spaces between the supporting-frames, a series of metallic rails secured to the tops of said track-beams and arranged to project at one end and recede at the other end of each beam, and single and double chairs for embracing and holding the abutting ends of the metallic rails in place relatively, substantially as hereinbefore explained.

8. In combination with an elevated tramway structure adapted to have its sections successively transposed or translated from one end to the other, a movable engine-house containing the hoisting-machine and motor and mounted upon a suitable track, upon which its relative position with the leading end of the structure may be varied at pleasure, in substantially the manner and for the purposes hereinbefore explained.

9. In combination with the movable engine-house and track of a transposable tramway structure, a suitable trough or rest for holding in line with the track-beam of the tramway a supplemental section of said track-beam and for supporting the leading end of said beam after its tail end shall have been secured to the leading end of the structure and until the house shall have been traversed far enough to permit the erection of an additional A-frame at the lower end of the structure, all as hereinbefore specified.

10. In combination with the traversing or adjustable house and a transposable tramway structure, a projecting crane-like device, hereinbefore specified, or its equivalent, for properly supporting and adjusting the leading end of a supplemental section, to be applied to the tramway in a proper position for the attachment thereto of an additional A-frame in adding a section to the leading end of the structure, as hereinbefore explained.

11. In combination with a tramway structure adapted to have its sections transposed, as specified, an adjustable anchor-carriage or terminal attachment for the hoist and traversing ropes to pull against, adapted to be released from the rearmost A-frame and to be re-engaged with the next forward A-frame, substantially as and for the purposes hereinbefore described.

12. In combination with an adjustable engine-house and a suitable trough or means for supporting thereon an extra section of the tramway, a suitable crane or lifting contrivance adapted to raise such supplementary section from the ground and place it on or within the supporting trough or device, all substantially as hereinbefore set forth.

13. In combination with a movable or traversing engine-house, a sectional track composed of transposable track beams and rails, suitable sill-pieces or ties, S, and a series of devices which operate, as specified, to simultaneously draw together the spliced track-beams and bind together these spliced parts and the sills on which they rest, all in substantially the manner hereinbefore set forth.

In witness whereof I have hereunto set my hand this 31st day of August, 1886.

ALEXANDER E. BROWN.

In presence of—
 E. T. SCOVILL,
 CHAS. W. KELLY.